(12) United States Patent
Gaebler et al.

(10) Patent No.: US 8,444,153 B2
(45) Date of Patent: May 21, 2013

(54) SEALING OF AT LEAST ONE SHAFT BY AT LEAST ONE HYDRAULIC SEAL

(75) Inventors: Miklos Gaebler, Postdam (DE); Stefan Hein, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 799 days.

(21) Appl. No.: 12/314,704

(22) Filed: Dec. 15, 2008

(65) Prior Publication Data

US 2009/0189356 A1    Jul. 30, 2009

(30) Foreign Application Priority Data

Dec. 14, 2007    (DE) .......................... 10 2007 060 890

(51) Int. Cl.
*F16J 15/447*    (2006.01)

(52) U.S. Cl.
USPC ............ 277/419; 277/412; 277/418; 277/427

(58) Field of Classification Search
USPC .......................... 277/412, 418, 419, 427, 428
See application file for complete search history.

(56) References Cited

U.S. PATENT DOCUMENTS

| | | | |
|---|---|---|---|
| 3,314,651 A | 4/1967 | Beale | |
| 4,570,947 A | 2/1986 | Smith | |
| 6,164,658 A | 12/2000 | Collin | |
| 6,568,688 B1 | 5/2003 | Boeck | |
| 6,845,987 B2 * | 1/2005 | McCutchan | 277/411 |
| 6,921,079 B2 * | 7/2005 | Rensch | 277/428 |
| 7,344,139 B2 * | 3/2008 | Gaebler et al. | 277/431 |
| 2004/0119238 A1 | 6/2004 | Skumawitz et al. | |
| 2006/0033289 A1 | 2/2006 | Gaebler et al. | |

FOREIGN PATENT DOCUMENTS

| | | |
|---|---|---|
| DE | 855648 | 11/1952 |
| DE | 1300347 | 7/1969 |
| DE | 4403776 | 8/1995 |
| DE | 10011063 | 9/2001 |
| DE | 10322027 | 12/2004 |
| DE | 102004040242 | 2/2006 |
| DE | 102005047696 | 3/2007 |
| EP | 0931962 | 7/1999 |
| EP | 1045178 | 10/2000 |
| EP | 1531295 | 5/2005 |
| FR | 2548752 | 1/1985 |
| FR | 2621970 | 4/1989 |

OTHER PUBLICATIONS

European Search Report dated Jun. 1, 2011 for counterpart European patent application.

* cited by examiner

*Primary Examiner* — Gilbert Lee
(74) *Attorney, Agent, or Firm* — Timothy J. Klima; Shuttleworth & Ingersoll, PLC

(57) ABSTRACT

An arrangement (30, 80) for sealing a shaft (40, 60, 90, 110) in a casing (31, 81) by a hydraulic seal (50, 70, 100, 120) includes at least one essentially annular, radially inwardly open cavity (51, 71, 101, 121) and at least one essentially annular, radially outwardly directed sealing element (54, 74, 102, 122) which projects into the cavity (51, 71, 101, 121). To provide a hydraulic shaft seal, in which swirl and friction losses in the sealing medium are low and no leakage occurs, the hydraulic seal (50, 70, 100, 120) is arranged on the inner side (42, 62, 92) or on the outer side (111) of the shaft (40, 60, 90, 110) and the cavity (51, 71, 101, 121) or the sealing element (54, 74, 102, 122) of the hydraulic seal (50, 70, 100, 120) is connected to a wall (32, 82) of the casing (31, 81).

19 Claims, 3 Drawing Sheets

SEALING OF AT LEAST ONE SHAFT BY AT LEAST ONE HYDRAULIC SEAL

Figure 1:
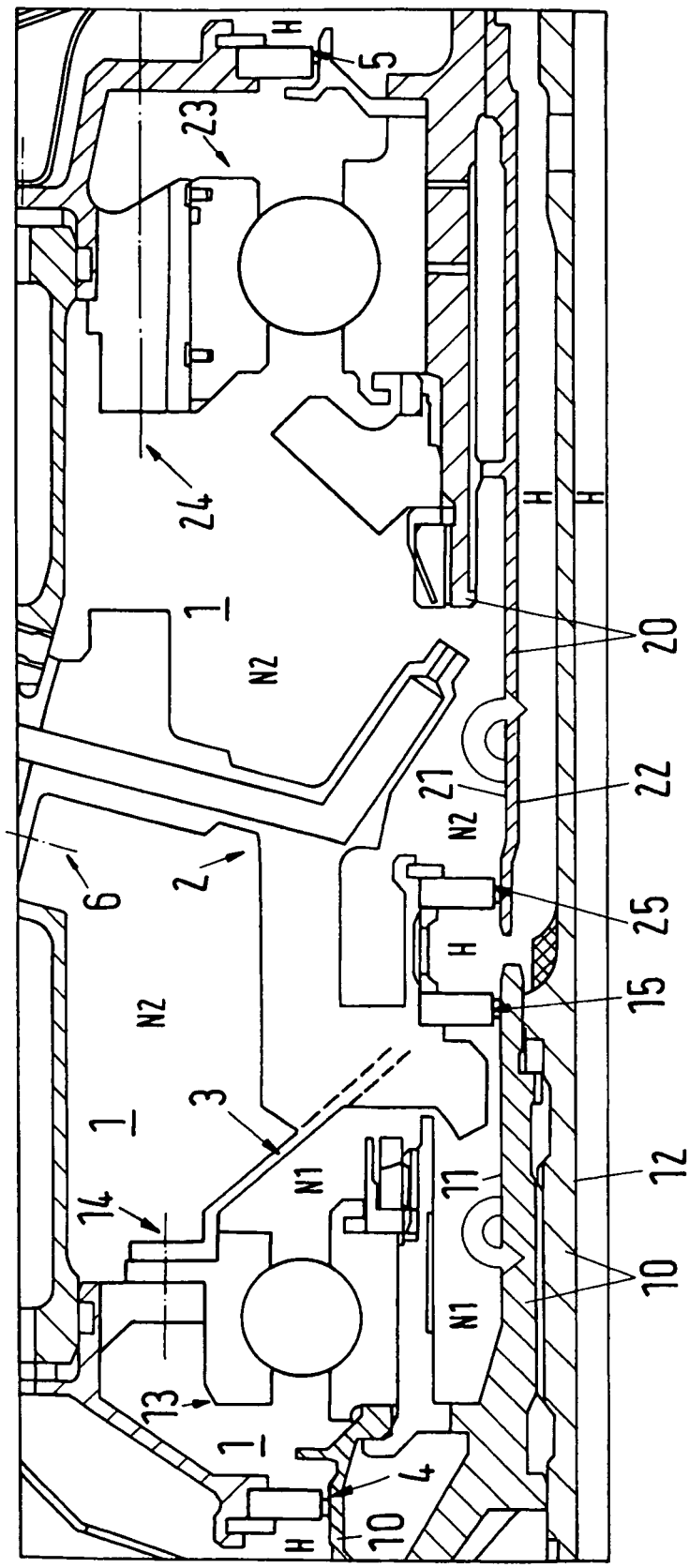

This application claims priority to German Patent Application DE102007060890.1 filed Dec. 14, 2007, the entirety of which is incorporated by reference herein.

This invention relates to an arrangement for sealing at least one shaft arranged in a casing by at least one hydraulic seal. Furthermore, the present invention relates to the application of the arrangement in an aeronautical or aerospace jet engine or in chemical or process plants.

In the art, a great variety of static and dynamic seals are known, with the dynamic seals being subdivided into contacting seals and non-contacting seals. Seals on shafts play a particularly important role. The best known and most frequently used contacting seals on shafts are glands, shaft sealing rings, brush seals and piston rings. As non-contacting shaft seals, use is especially made of gap seals, labyrinth seals or centrifugal seals. In the case of centrifugal seals, a hydraulic sealing medium, in particular oil, is set into rotation by centrifugal action, thereby filling an annular gap and providing a seal. Therefore, centrifugal seals are frequently also referred to as hydraulic seals.

Especially with multi-shaft jet engines, the problem is encountered that shafts must be sealed against each other to separate high-pressure and low-pressure zones from each other. For this application, hydraulic seals have been known whose components co-rotate with the shafts or in the sealing medium between the shafts.

Specifications EP 1 045 178 B1 and DE 10 2004 040 242 A1 each describe a hydraulic sealing arrangement in a jet engine for sealing high-pressure and low-pressure zones on rotating shafts arranged within each other. Either hydraulic sealing arrangement essentially has a cavity in the radially outer shaft and a sealing element on the radially inner shaft. Accordingly, the cavity and the sealing element each co-rotate with the associated shaft. The centrifugal force acting upon the sealing medium produces a rotational flow in the sealing medium. The different velocities of cavity and sealing element produce swirl and friction losses in the sealing medium, resulting in heating of the sealing medium and associated coking. Furthermore, neither of the arrangements is suitable for counter-rotating shafts.

In Specification DE 10 2005 047 696 A1, a hydraulic sealing arrangement in a jet engine is described which is capable of sealing counter-rotating shafts. For this purpose, a rib-type, radial barrier fin is provided between two shafts arranged within each other. This barrier fin is floatingly arranged between the shafts. However, since the barrier fin is sealed against the radially inner shaft merely by an air gap, leakage will occur at this point.

The present invention, in a broad aspect, provides a hydraulic shaft seal in which the swirl and friction losses in the sealing medium are low and no leakage occurs.

The present invention provides an arrangement for sealing at least one shaft arranged in a casing by at least one hydraulic seal. The hydraulic seal includes at least one essentially annular, radially inwardly open cavity and at least one essentially annular, radially outwardly directed sealing element which projects into the cavity. The hydraulic seal is arranged on the inner side or the outer side of the shaft, with the cavity or the sealing element of the hydraulic seal being connected to a wall of the casing.

The design, while being a simple form of hydraulic seal, provides for optimum sealing in operation. With the hydraulic seal being alternatively arranged on the inner side or the outer side of the shaft, the arrangement of the hydraulic seal can be varied in accordance with the respective requirements.

Furthermore, the arrangement according to the present invention provides for saving of sealing medium, wear-free operation and relief of the valve system of the bearing chamber. The arrangement is leakage-free and withstands even larger pressure differences.

In particular, the hydraulic sealing arrangement features a stationary seal on the side facing away from the wall. The stationary seal prevents leakage of sealing medium at the shaft when at rest.

In one embodiment, the cavity of the first hydraulic seal is co-rotatingly arranged on the inner side of the shaft and the sealing element is connected to the wall.

In this embodiment, the stationary seal includes an annular disk, which is connected to the inner side of the shaft, and a radially inwardly directed groove into which a piston ring which adjoins an annular extension of the sealing element is inserted. The piston ring prevents leakage of the sealing medium from the hydraulic seal when the shaft is at rest.

In an alternative embodiment, the cavity of the hydraulic seal is provided in the wall and the sealing element is co-rotatingly arranged on the outer side of the shaft. In this embodiment, the weight of the wall is particularly low since the inner diameter of the wall or the cavity, respectively, is larger than with the first embodiment.

In this embodiment, the stationary seal includes an annular disk, which is connected to the wall, and a radially inwardly directed groove into which a piston ring which adjoins the shaft is inserted. As with the first embodiment, the piston ring prevents leakage of the sealing medium at the shaft when the latter is at rest.

In both embodiments, the hydraulic seal can be provided with a cooling device. The cooling device can, for example, effect active flushing of the hydraulic seal and enable the application of the hydraulic seal in the high-temperature area.

Preferably, the cavity of the hydraulic seal is connected via at least one duct to a drain line and/or a space between the shaft and the casing. This enables the sealing medium to be discharged from the hydraulic seal to prevent the sealing medium from dwelling too long in the hydraulic seal and its properties from being affected by heat and friction (coking) in the course of time.

In another embodiment, the wall separates at least two shafts from each other, with a first hydraulic seal being arranged on the first shaft and a second hydraulic seal being arranged on the second shaft. Using one hydraulic seal on the first shaft and another one on the second shaft enables counter-rotating shafts to be sealed by two hydraulic seals.

In this embodiment, the first hydraulic seal and the second hydraulic seal each feature one stationary seal on the side facing away from the wall. Here again, the stationary seals prevent leakage of oil when at rest.

In yet another embodiment, the second hydraulic seal is arranged in the interior of the first hydraulic seal. With this arrangement, the second hydraulic seal is integrated into the first hydraulic seal, providing for compactness of the design.

In this embodiment, the second hydraulic seal includes an essentially annular cavity in the sealing element of the first hydraulic seal and an essentially annular sealing element of the second hydraulic seal which projects into the cavity in the sealing element of the first hydraulic seal. Although the second hydraulic seal is integrated in the first hydraulic seal, separate sealing of the two shafts is ensured. Furthermore, weight and installation space of the arrangement are kept low.

Preferably, the sealing element of the first hydraulic seal is connected to the wall and the sealing element of the second hydraulic seal is connected to the second shaft. This prevents movement of a sealing element by two counter-rotating shafts, as described, for example, in Specification DE 10 2005 047 696 A1, and the losses being caused therefrom.

Furthermore, in the fourth embodiment, a second duct is arranged in the sealing element of the first hydraulic seal which connects the cavity of the second hydraulic seal with the cavity of the first hydraulic seal. Via the second duct, the sealing medium can be discharged from the cavity of the first hydraulic seal.

In this embodiment, only the first hydraulic seal is provided with a stationary seal on the side facing away from the wall. A single stationary seal is sufficient since the second hydraulic seal is arranged in the interior of the first hydraulic seal.

In the third and fourth embodiment, the first shaft and the second shaft can be counter-rotating shafts. Here, the arrangement according to the present invention is advantageous in that each of the shafts is sealed against a non-co-rotating item, i.e. a cavity or a sealing element.

In all embodiments, at least one injection nozzle is arranged on the first hydraulic seal. The injection nozzle enables the sealing medium to be supplied to the first hydraulic seal in a defined manner.

Furthermore at least one second injection nozzle can be arranged on the second hydraulic seal. The second injection nozzle enables the sealing medium to be supplied to the second hydraulic seal in a defined manner.

Alternatively, in the fourth embodiment, only the second hydraulic seal is provided with at least one injection nozzle. With the sealing medium being forwarded to the first hydraulic seal via the second duct, a second injection nozzle for the first hydraulic seal is not required.

The arrangement can be used in an aeronautical or aerospace jet engine. On jet engines, areas of different pressures encounter each other, for example in the compressor section. Owing to its low maintenance effort, at least one hydraulic seal of the arrangement is particularly suitable to seal these areas. Furthermore, the arrangement can be used in chemical and process plants.

Figure 2:
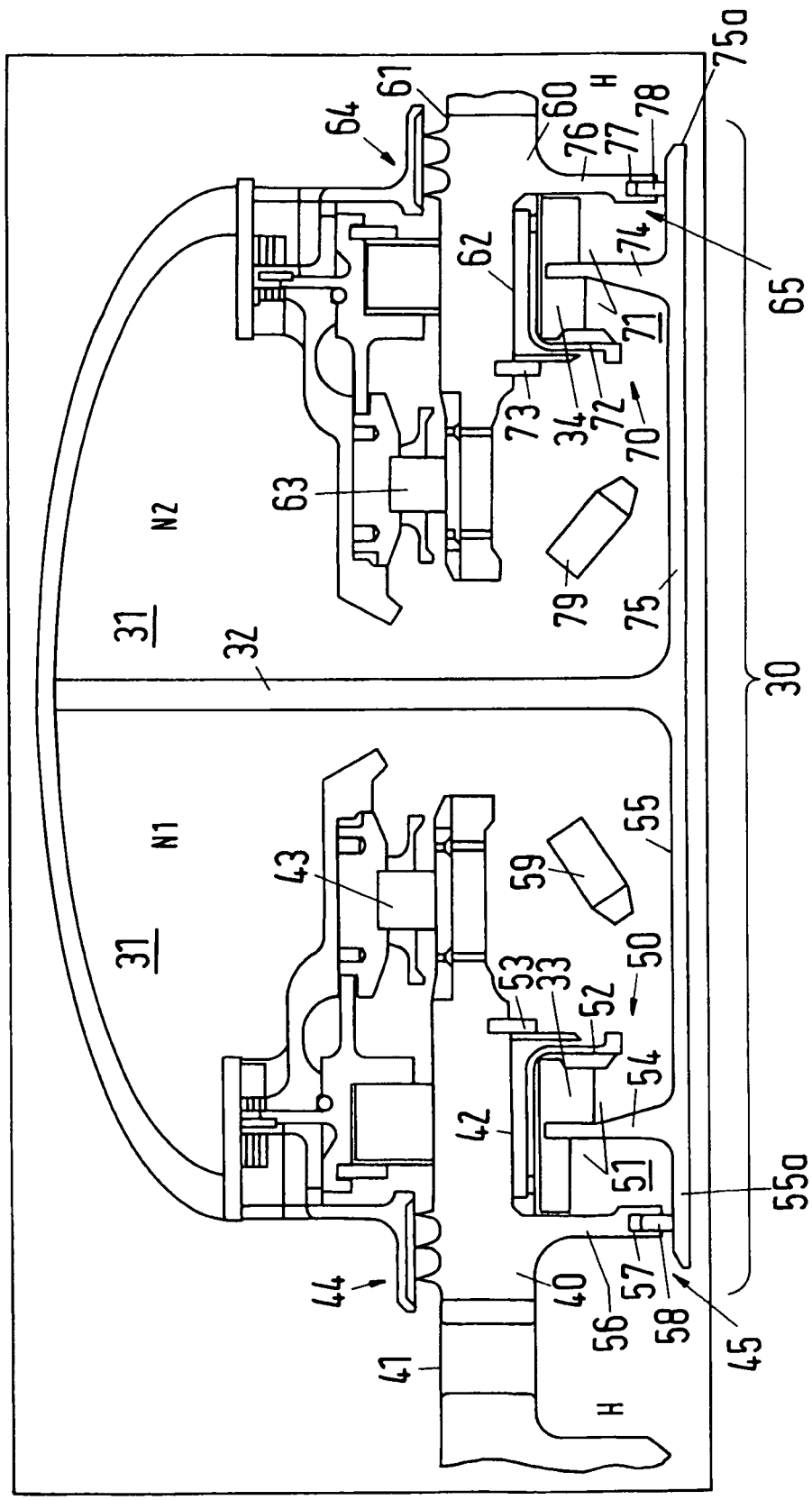
Figure 3:
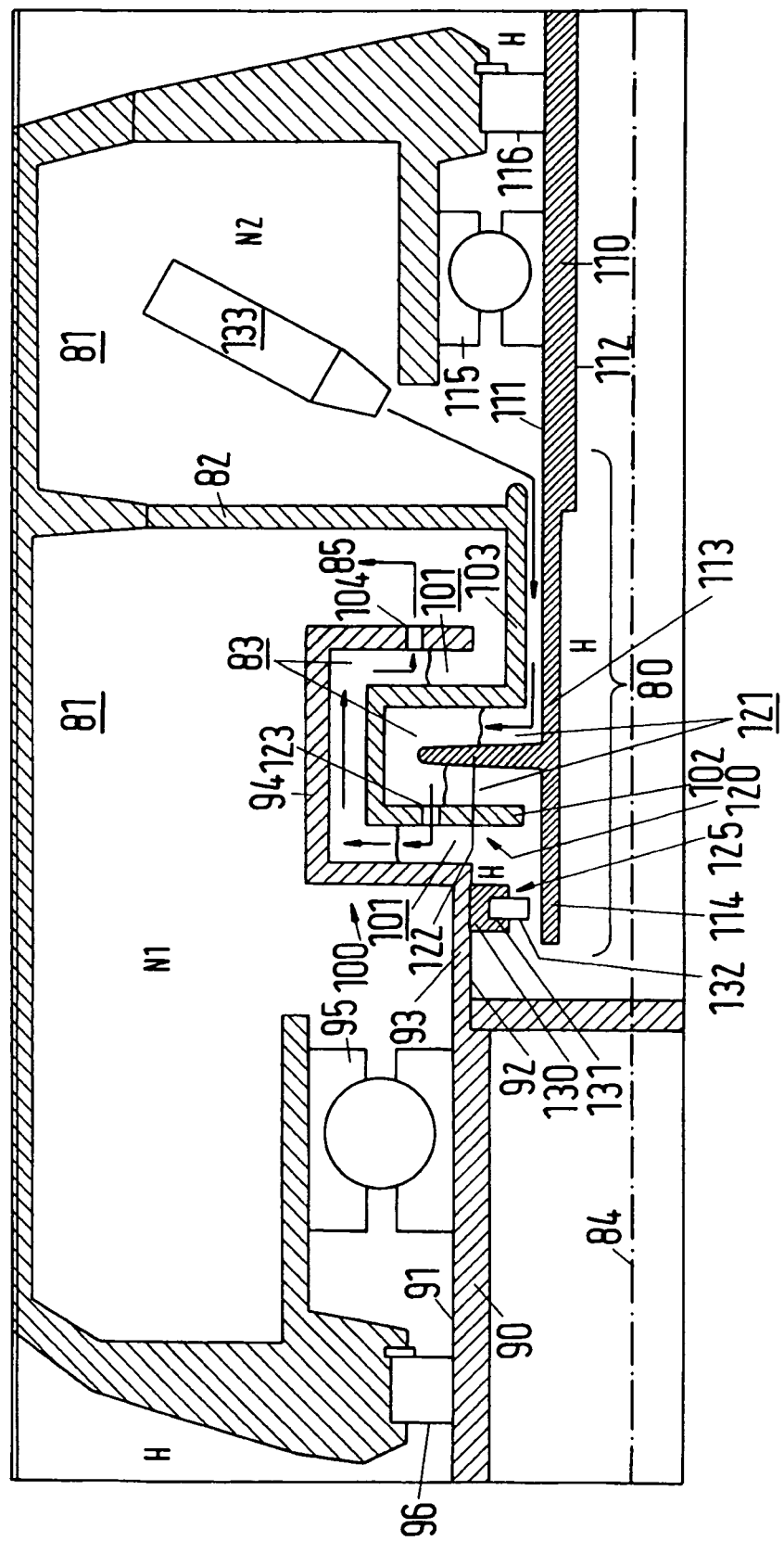

The present invention is more fully described in light of the accompanying drawing showing the state of the art and two embodiments of the inventive arrangement for sealing at least one shaft arranged in a casing by at least one hydraulic seal. In the drawings, FIG. 1 (Prior Art) is a design representation of a bearing chamber with brush seals for two counter-rotating shafts of a compressor in a jet engine, FIG. 2 is a schematic representation of a first embodiment of the inventive arrangement with two separate hydraulic seals, and FIG. 3 is a schematic representation of a second embodiment of the inventive arrangement with two hydraulic seals arranged within each other.

FIG. 1 shows a cutaway through a casing with a bearing arrangement for two shafts 10, 20 in a jet engine according to the state of the art. The casing encloses a bearing chamber 1.

The bearing chamber 1 encloses an oil injection device 2, an inner wall 3, a forward brush seal 4 and a rearward brush seal 5. Also arranged in the bearing chamber 1 are the first shaft 10 with a first bearing 13, a first threaded connection 14 and a first brush seal 15. In the bearing chamber 1 are further arranged the second shaft 20 with a second bearing 23, a second threaded connection 24 and a second brush seal 25.

The bearing chamber 1 is subdivided by the inner wall 3 into two low-pressure zones, N1 and N2. The first shaft 10 has an outer side 11 and an inner side 12. The second shaft 20 has an outer side 21 and an inner side 22.

In the first low-pressure zone N1, the first bearing 13 carries the first shaft 10 and is attached in the bearing chamber 1 by the first threaded connection 14. The first threaded connection 14 also attaches the inner wall 3 to the bearing chamber 1. The forward brush seal 4 is arranged between the bearing chamber 1 and the first shaft 10. The first brush seal 15 is provided between the inner wall 3 and the outer side 11 of the first shaft 10.

In the second low-pressure zone N2, the second bearing 23 carries the second shaft 20 and is attached in the bearing chamber 1 by the second threaded connection 24. The rearward brush seal 5 is arranged between the bearing chamber 1 and the second shaft 20. The second brush seal 25 is provided between the inner wall 3 and the outer side 21 of the second shaft 20. By a threaded connection 6, the oil injection device 2 is attached to the bearing chamber 1.

The first shaft 10 and the second shaft 20 are concentrically arranged about the same horizontal (longitudinal) axis, and partly extend within each other, with the longitudinal axis not being shown. The first shaft 10 bears the low-pressure compressor, while the second shaft 20 bears high-pressure compressor, with both compressors not being shown.

The brush seals 4, 5, 15, 25 are conventionally designed, with the individual components not being shown. On each brush seal 4, 5, 15, 25, radially inwardly directed bristles are fitted on the radially inner rim of an annular disk which contact the outer sides 11, 21 of the first and the second shaft 10, 20, respectively.

In operation, the bearing chamber 1 is, in a compressor of a jet engine, surrounded by a high-pressure zone H in which the high pressure of the compressed air is present. The high-pressure zone H reaches into the interior of the first and the second shaft 10, 20. The first low-pressure zone N1 and the second low-pressure zone N2 in the bearing chamber 1 ideally have identical pressures so that the inner wall 3 is not loaded. The oil required for lubricating the first and the second bearing 13, 23 is supplied to the bearings 13, 23 by the oil injection device 2 and is swirled in the bearing chamber 1. The oil-air mixture produced in each case is separately exhausted from the first low-pressure zone N1 and the second low-pressure zone N2, thereby producing the low pressures.

The forward brush seal 4 seals the first low-pressure zone N1 between the bearing chamber 1 and the first shaft 10 against the high-pressure zone H. Sealing between the inner wall 3 and the first shaft 10 is done by the first brush seal 15.

The rearward brush seal 5 seals the second low-pressure zone N2 between the bearing chamber 1 and the second shaft 20 against the high-pressure zone H. Sealing between the inner wall 3 and the second shaft 20 is done by the second brush seal 25.

The first shaft 10 of the low-pressure compressor rotates slower than the second shaft 20 of the high-pressure compressor. Also, the two shafts 10, 20 rotate in opposite directions. Therefore, the bristles of the forward brush seal 4 and of the first brush seal 15 slip over the outer side 11 of the first shaft 10 only. The bristles of the rearward brush seal 5 and of the second brush seal 25 slip over the outer side 21 of the second shaft 20 only.

FIG. 2 shows a cutaway of the first embodiment of an arrangement 30 according to the present invention in the above mentioned compressor of a jet engine.

The arrangement 30 includes a casing with a bearing chamber 31, a wall 32 appertaining to the bearing chamber 31, a first shaft 40, a first bearing 43, a first labyrinth seal 44 and a first hydraulic seal 50 with a first injection nozzle 59. Furthermore the arrangement 30 includes a second shaft 60, a second bearing 63, a second labyrinth seal 64 and a second hydraulic seal 70 with a second injection nozzle 79.

The first shaft 40 has an outer side 41 and an inner side 42. The second shaft 60 has an outer side 61 and an inner side 62. The first shaft 40 and the second shaft 60 have a common longitudinal axis, this axis not being shown.

The first hydraulic seal 50 includes a cavity 51, an insert 52, a retaining ring 53, a sealing element 54 with a connecting element 55 and an extension 55a, an annular disk 56 with a groove 57 and a piston ring 58. The second hydraulic seal 70 includes a cavity 71, an insert 72, a retaining ring 73, a sealing element 74 with a connecting element 75 and an extension 75a, an annular disk 76 with a groove 77 and a piston ring 78.

The arrangement 30 is located in a casing which hereinafter is referred to as bearing chamber 31. The vertical wall 32 subdivides the bearing chamber 31 into a first low-pressure zone N1 and a second low-pressure zone N2.

The first shaft 40 projects horizontally into the first low-pressure zone N1. The first bearing 43 is attached in the bearing chamber 31 and carries the first shaft 40. The first hydraulic seal 50 is located on the inner side 42 of the first shaft 40.

The first hydraulic seal 50 is confined towards the first low pressure zone N1 by the annular insert 52 which is angled radially inwards. The insert 52 is arranged on the inner side 42 of the first shaft 40 and secured by the retaining ring 53. Towards the high-pressure zone H, the first hydraulic seal 50 is confined by the annular disk 56 which extends radially inwards and is firmly connected to the first shaft 40. The insert 52 and the annular disk 56 together form the annular cavity 51.

The annular sealing element 54 projects radially into the cavity 51. Adjoining the sealing element 54 in the direction of the first low-pressure zone N1 is the annular connecting element 55 which is firmly connected to the wall 32. Adjoining the sealing element 54 in the direction of the high-pressure zone H is the again annular extension 55a. The annular disk 56 is connected to the inner side 42 of the first shaft 40 and has, on its inner circumference, a stationary seal 45 which includes the inwardly directed radial groove 57 and the piston ring 58 inserted therein. The piston ring 58 radially inwardly adjoins the extension 55a of the sealing element 54.

The first injection nozzle 59 is directed towards an annular interspace existing between the insert 52 and the annular connecting element 55 of the sealing element 54. Located on the outer side 41 of the first shaft 40 is the first labyrinth seal 44 which is connected to the bearing chamber 31.

The second shaft 60 projects horizontally into the second low-pressure zone N2. The second bearing 63 is attached in the bearing chamber 31 and carries the second shaft 60. The second hydraulic seal 70 is located on the inner side 62 of the second shaft 60.

The second hydraulic seal 70 is confined towards the second low pressure zone N2 by the annular insert 72 which is angled radially inwards. The insert 72 is arranged on the inner side 62 of the second shaft 60 and secured by the retaining ring 73. Towards the high-pressure zone H, the second hydraulic seal 70 is confined by the annular disk 76 which extends radially inwards and is firmly connected to the second shaft 60. The insert 72 and the annular disk 76 together form the annular cavity 71.

The annular sealing element 74 projects radially into the cavity 71. Adjoining the sealing element 74 in the direction of the second low-pressure zone N2 is the annular connecting element 75 which is firmly connected to the wall 32. Adjoining the sealing element 74 in the direction of the high-pressure zone H is the again annular extension 75a. The annular disk 76 is connected to the inner side 62 of the second shaft 60 and has, on its inner circumference, a stationary seal 65 which includes the inwardly directed radial groove 77 and the piston ring 78 inserted therein. The piston ring 78 adjoins the extension 75a of the sealing element 74.

The second injection nozzle 79 is directed towards an annular interspace existing between the insert 72 and the annular connecting element 75 of the sealing element 74. Located on the outer side 61 of the second shaft 60 is the second labyrinth seal 64 which is connected to the bearing chamber 31.

In lieu of the labyrinth seals 44 and 64, one hydraulic seal each could be provided between the bearing chamber 31 and the outer side 41 of the first shaft 40 or the outer side 61 of the second shaft 60, respectively.

In operation, the bearing chamber 1 is surrounded, as in the state of the art (cf. FIG. 1), by a high-pressure zone H in a compressor of the jet engine in which the high pressure of the compressed air is present. The high-pressure zone H reaches into the interior of the first and second shaft 40, 60.

By first injection nozzle 59, oil is injected through the interspace between the insert 52 and the connecting element 55 of the sealing element 54 into the first hydraulic seal 50. The insert 52 co-rotates with the first shaft 40, thus producing a centrifugal force in the injected oil. The oil is transported radially outwards within the cavity 51. As a result, the oil 33 fills the radially outward area of the cavity 51 and, hence, the gap between the insert 52 and the sealing element 54. Owing to the high pressure in the high-pressure zone H, the oil 33 is additionally forced into the cavity 51. Accordingly, the oil 33 forms a seal between the first low-pressure zone N1 and the high-pressure zone H.

The cavity 51 can additionally be provided with a duct by which the oil 33 is removed from the cavity 51 and supplied to a cooling device not shown. Upon passing the cooling device, the oil 33 can be re-supplied to the first hydraulic seal 50.

Upon standstill of the first shaft 40, the piston ring 58 of the stationary seal 45 will come to rest against the extension 55a of the sealing element 54, thus preventing leakage of the oil 33 which, in the absence of centrifugal force, is no longer pressed into the cavity 51.

Oil is injected through the interspace between the insert 72 and the connecting element 75 of the sealing element 74 into the second hydraulic seal 70 by the second injection nozzle 79. The insert 72 co-rotates with the second shaft 60, thus producing a centrifugal force in the injected oil. The oil is transported radially outwards within the cavity 71. As a result, the oil 34 fills the radially outward area of the cavity 71 and, hence, the gap between the insert 72 and the sealing element 74. Owing to the high pressure in the high-pressure zone H, the oil 34 is additionally forced into the cavity 71. Accordingly, the oil 34 forms a seal between the second low-pressure zone N2 and the high-pressure zone H.

The cavity 71 can additionally be provided with a duct by which the oil 34 is removed from the cavity 71 and supplied to a cooling device not shown. Upon passing the cooling device, the oil 34 can be re-supplied to the second hydraulic seal 70.

With the first hydraulic seal 50 and the second hydraulic seal 70 being separate from each other, for example different oils for different applications, as applicable, can be used in the first low-pressure zone N1 and in the second low-pressure zone N2.

Upon standstill of the second shaft 60, the piston ring 78 of the stationary seal 65 will come to rest against the extension 75a of the sealing element 74, thus preventing leakage of the oil 34 which, in the absence of centrifugal force, is no longer pressed into the cavity 71.

FIG. 3 shows a cutaway of the second embodiment of an arrangement 80 according to the present invention in the above mentioned compressor of a jet engine.

The arrangement 80 includes a wall 82 appertaining to the casing or to the bearing chamber 81, respectively, a first shaft 90, a first bearing 95, a first shaft seal 96 and a first hydraulic seal 100. Furthermore the arrangement 80 includes a second shaft 110, a second bearing 115, a second shaft seal 116, a second hydraulic seal 120 and an injection nozzle 133.

The first shaft 90 has an outer side 91, an inner side 92, a shaft end 93 and an extension 94 with a duct 104. The second shaft 110 has an outer side 111, an inner side 112, a shaft end 113 and an extension 114. The first shaft 90 and the second shaft 110 have a common longitudinal axis 84.

The first hydraulic seal 100 includes a cavity 101, a sealing element 102 with a duct 104 and a connecting element 103 as well as an annular disk 130 with a groove 131 and a piston ring 132, which form a stationary seal 125. The second hydraulic seal 120 includes a cavity 121 and a sealing element 122 with an extension 114 at the shaft end 113.

The arrangement 80 is located in a casing which hereinafter is referred to as bearing chamber 81. The vertical wall 82 subdivides the bearing chamber 81 into a first low-pressure zone N1 and a second low-pressure zone N2.

The first shaft 90 projects horizontally into the first low-pressure zone N1. The first bearing 95 is attached in the bearing chamber 81 and carries the first shaft 90. The first hydraulic seal 100 adjoins the shaft end 93. Located on the outer side 91 of the first shaft 90 is the first shaft seal 96 which is connected to the bearing chamber 81.

The first hydraulic seal 100 is confined towards the first low-pressure zone N1 by the extension 94 of the first shaft 90. The extension 94 is annular, has a U-shaped cross-section and is open radially inwards. Arranged in parallel to the longitudinal axis 84 and towards the wall 82 is the duct 104 in the extension 94. Towards the high-pressure zone H, the first hydraulic seal 100 is confined by the annular disk 130 which extends radially inwards and is firmly connected to the first shaft 90. On its inner circumference, the annular disk 130 is provided with the stationary seal 125 with the radial groove 131 extending radially inwards and accommodating the piston ring 132.

The annular sealing element 102 with U-shaped, radially inwardly open cross-section projects radially into the cavity 101. The sealing element 102 adjoins the annular connecting element 103 of the wall 82. The duct 123 provided in the sealing element 102 is arranged in parallel to the longitudinal axis 84 and opposite to the wall 82.

The second shaft 110 projects horizontally into the second low-pressure zone N2. The second bearing 115 is attached in the bearing chamber 81 and carries the second shaft 110. The second hydraulic seal 120 adjoins the shaft end 113. Located on the outer side 111 of the second shaft 110 is the second shaft seal 116, which is connected to the bearing chamber 81.

The second hydraulic seal 120 is confined towards the first hydraulic seal 100 by the cross-sectionally U-shaped sealing element 102 which is connected to the wall 82 by the annular connecting element 103 and forms the cavity 121.

The annular, solid sealing element 122 is firmly connected to the shaft end 113 of the second shaft 110 and projects radially into the cavity 121. Axially adjoining the sealing element 122, and extending into the extension 94 of the first shaft 90, is the annular extension 114 of the second shaft 110.

The injection nozzle 133 is directed towards the annular interspace present between the connecting element 103 and the shaft end 113 of the second shaft 110 of the second hydraulic seal 120. Furthermore, an additional injection nozzle can be directed towards the interspace between the extension 94 and the sealing element 102 of the first hydraulic seal 100.

The first and second shaft seals 96 and 116 may also be designed as hydraulic seals.

In operation, the bearing chamber 81 is, as in the state of the art (cf. FIG. 1), surrounded by a high-pressure zone H in a compressor of the jet engine in which the high pressure of the compressed air is present. The high-pressure zone H reaches into the interior of the first and second shaft 90, 110.

By the injection nozzle 133, oil is injected through the interspace between the connecting element 103 and the shaft end 113 of the second shaft 110 into the second hydraulic seal 120. Owing to the rotation of the second shaft 110 and the sealing element 122, a centrifugal force is produced in the injected oil 83. The centrifugal force transports the oil 83 radially outwards within the cavity 121. As a result, the oil 83 fills the radially outward area of the cavity 121 and, hence, the gap between the sealing element 122 and the sealing element 102. The high pressure in the high-pressure zone H additionally forces the oil 83 into the cavity 121. Accordingly, the oil forms a seal between the second low-pressure zone N2 and the high-pressure zone H. Part of the oil is fed from the second hydraulic seal 120 into the first hydraulic seal 100 via the duct 123.

In the first hydraulic seal 100, the oil 83 is forced into the cavity 101 by the centrifugal force exerted on it by the rotation of the extension 94 of the first shaft 90. As a result, the oil 83 fills the cavity 101 between the extension 94 and the sealing element 102, thereby sealing the low-pressure zone N1 against the high-pressure zone H. The high pressure in the high-pressure zone H additionally forces the oil 83 into the cavity 121. When the oil 83 has passed the cavity 101, a partial flow 85 of the oil 83 is branched off via the duct 104 and fed to a cooling device not shown. Upon cooling the oil in the cooling device, the oil can be re-supplied to the first and second hydraulic seal 100, 120.

In this embodiment, the sealing element 102 of the first hydraulic seal 100 has a dual function in that the sealing element 102 of the first hydraulic seal 100 simultaneously forms the cavity 121 of the second hydraulic seal 120. Thus, the sealing element 102 is a common part of the first hydraulic seal 100 and the second hydraulic seal 120.

With the sealing element 102 being stationary, the arrangement 80 is especially suitable for counter-rotating shafts, with the first shaft 90 rotating around the sealing element 102 on the outside and the second shaft 110 rotating inside the sealing element 102.

Both the extension 94 and the sealing element 102 can be made from two annular parts using a friction-welding process. Attachment of the extension 94 to the shaft end 93 and of the sealing element 102 to the connecting element 103 can be done by flanges not shown.

In lieu of oil, dissimilar hydraulic sealing media may be used provided they are chemically compatible and mixable.

In particular where the arrangement is used in chemical or process plants, it is important that the first low-pressure zone N1 and the second low-pressure zone N2 are separated from each other by the wall 32, 82 to prevent the gas compositions contained in the low-pressure zones N1, N2 from reacting or mixing with each other. In lieu of the gas compositions, a vacuum may predominate in one or both of the two low-pressure zones N1, N2.

LIST OF REFERENCE NUMERALS

H High-pressure zone
N1 First low-pressure zone
N2 Second low-pressure zone
1 Bearing chamber
2 Oil injection device
3 Inner wall
4 Forward brush seal
5 Rearward brush seal
6 Threaded connection
10 First shaft
11 Outer side
12 Inner side
13 First bearing
14 First threaded connection
15 First brush seal
20 Second shaft
21 Outer side
22 Inner side
23 Second bearing
24 Second threaded connection
25 Second brush seal
30 Arrangement
31 Bearing chamber
32 Wall
33 Oil
34 Oil
40 First shaft
41 Outer side
42 Inner side
43 First bearing
44 First labyrinth seal
45 Stationary seal
50 First hydraulic seal
51 Cavity
52 Insert
53 Retaining ring
54 Sealing element
55 Connecting element
55a Extension
56 Annular disk
57 Groove
58 Piston ring
59 First injection nozzle
60 Second shaft
61 Outer side
62 Inner side
63 Second bearing
64 Second labyrinth seal
65 Stationary seal
70 Second hydraulic seal
71 Cavity
72 Insert
73 Retaining ring
74 Sealing element
75 Connecting element
75a Extension
76 Annular disk
77 Groove
78 Piston ring
79 Second injection nozzle
80 Arrangement
81 Bearing chamber
82 Wall
83 Oil
84 Longitudinal axis
85 Partial flow of oil
90 First shaft
91 Outer side
92 Inner side
93 Shaft end
94 Extension
95 First bearing
96 First shaft seal
100 First hydraulic seal
101 Cavity
102 Sealing element
103 Connecting element
104 Duct
110 Second shaft
111 Outer side
112 Inner side
113 Shaft end
114 Extension
115 Second bearing
116 Second shaft seal
120 Second hydraulic seal
121 Cavity
122 Sealing element
123 Duct
125 Stationary seal
130 Annular disk
131 Groove
132 Piston ring
133 Injection nozzle

What is claimed is:

1. An arrangement for sealing first and second shafts positioned in a casing, comprising
at least one hydraulic seal including:
at least one essentially annular, radially inwardly open cavity, and
at least one essentially annular, radially outwardly directed sealing element which projects into the cavity;
wherein, the hydraulic seal is positioned on one chosen from an inner side and an outer side of the shaft, and one chosen from the cavity and the sealing element of the hydraulic seal is connected to a fixed wall of the casing;
wherein the fixed wall separates the first and second shafts from each other, with the at least one hydraulic seal including a first hydraulic seal being arranged on the first shaft and a second hydraulic seal arranged on the second shaft;
wherein the first shaft and the second shaft are counter-rotating shafts;
wherein the first shaft rotates in a first circumferential direction, the second shaft rotates in a second circumferential direction opposite to the first circumferential direction;
wherein a portion of the first hydraulic seal attached to the fixed wall of the casing opposes rotation of hydraulic fluid in the first hydraulic seal in the first circumferential direction and a portion of the second hydraulic seal attached to the fixed wall of the casing opposes rotation of hydraulic fluid in the second hydraulic seal in the opposite second circumferential direction to isolate the rotation of hydraulic fluids in the first and second hydraulic seals from each other.

2. The arrangement of claim 1, wherein the hydraulic seal includes a stationary seal on a side facing away from the wall.

3. The arrangement of claim 2, wherein the stationary seal includes an annular disk, which is connected to the inner side of the shaft and includes a radially inwardly directed groove, into which a piston ring is inserted which adjoins an annular extension of the sealing element.

4. The arrangement of claim 2, wherein the stationary seal includes an annular disk, which is connected to the wall and includes a radially inwardly directed groove, into which a piston ring is inserted which adjoins the shaft.

5. The arrangement of claim 2, wherein the first hydraulic seal and the second hydraulic seal each include a stationary seal on a side facing away from the wall.

6. The arrangement of claim 1, wherein the cavity is co-rotatingly positioned on the inner side of the shaft and the sealing element is connected to the wall.

7. The arrangement of claim 1, wherein the cavity is positioned on the wall and the sealing element is co-rotatingly positioned on the outer side of the shaft.

8. The arrangement of claim 1, wherein the hydraulic seal is connected to a cooling device.

9. The arrangement of claim 8, wherein the cavity is connected via at least one duct to at least one chosen from a drain line and a space between the shaft and the casing.

10. The arrangement of claim 1, and further including at least one injection nozzle positioned to inject oil into the first hydraulic seal.

11. The arrangement of claim 10, and further including at least one second injection nozzle positioned to inject oil into the second hydraulic seal.

12. An arrangement for sealing first and second shafts positioned in a casing, comprising:
a first hydraulic seal being arranged on the first shaft including:
at least one essentially annular, radially inwardly open first cavity, and
at least one essentially annular, radially outwardly directed first sealing element which projects into the first cavity;
a second hydraulic seal being arranged on the second shaft including:
at least one essentially annular, radially inwardly open second cavity, and
at least one essentially annular, radially outwardly directed second sealing element which projects into the second cavity;
wherein the first hydraulic seal is positioned on an inner side of the first shaft and the second hydraulic seal is positioned on an outer side of the second shaft,
wherein the first sealing element includes the second cavity on a radially inner side of the first sealing element such that the second hydraulic seal is positioned in an interior of the first hydraulic seal;
the first sealing element and the second cavity being connected to a fixed wall of the casing;
wherein the first shaft and the second shaft are counter-rotating shafts;
wherein the first shaft rotates in a first circumferential direction, the second shaft rotates in a second circumferential direction opposite to the first circumferential direction;
wherein the first sealing element opposes rotation of hydraulic fluid in the first hydraulic seal in the first circumferential direction and the second cavity opposes rotation of hydraulic fluid in the second hydraulic seal in the opposite second circumferential direction to isolate the rotation of hydraulic fluids in the first and second hydraulic seals from each other.

13. The arrangement of claim 12, wherein the second sealing element of the second hydraulic seal is connected to the second shaft.

14. The arrangement of claim 12, and further including a second duct arranged in the first sealing element of the first hydraulic seal, the second duct connecting the second cavity of the second hydraulic seal to the first cavity of the first hydraulic seal.

15. The arrangement of claim 12, wherein only the first hydraulic seal includes a stationary seal on a side facing away from the wall.

16. The arrangement of claim 12, and further including at least one injection nozzle positioned to inject oil into the second hydraulic seal only.

17. The arrangement of claim 12, and further including a first duct connecting the first cavity of the first hydraulic seal to at least one chosen from a drain line and a space between the first shaft and the casing.

18. The arrangement of claim 17, and further including a second duct arranged in the first sealing element of the first hydraulic seal, the second duct connecting the second cavity of the second hydraulic seal to the first cavity of the first hydraulic seal.

19. The arrangement of claim 18, and further including at least one injection nozzle positioned to inject oil into the second cavity of the second hydraulic seal only, with the oil flow then flowable into the first cavity of the first hydraulic seal via the second duct.

* * * * *